United States Patent
Narayan

(10) Patent No.: US 12,206,683 B2
(45) Date of Patent: Jan. 21, 2025

(54) DETECTION OF REPLACEMENT/COPY-PASTE ATTACKS THROUGH MONITORING AND CLASSIFYING API FUNCTION INVOCATIONS

(71) Applicant: Palo Alto Networks, Inc., Santa Clara, CA (US)

(72) Inventor: Krishnan Shankar Narayan, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 516 days.

(21) Appl. No.: 17/305,303

(22) Filed: Jul. 2, 2021

(65) Prior Publication Data

US 2023/0007014 A1    Jan. 5, 2023

(51) Int. Cl.
H04L 29/06 (2006.01)
G06F 18/24 (2023.01)
H04L 9/40 (2022.01)
H04L 67/133 (2022.01)

(52) U.S. Cl.
CPC .......... *H04L 63/1416* (2013.01); *G06F 18/24* (2023.01); *H04L 67/133* (2022.05)

(58) Field of Classification Search
USPC .......................................................... 726/23
See application file for complete search history.

(56) References Cited

U.S. PATENT DOCUMENTS

| | | | |
|---|---|---|---|
| 2013/0333046 A1* | 12/2013 | Sambamurthy | G06F 21/10 726/26 |
| 2019/0273754 A1* | 9/2019 | Ting | G06N 3/088 |
| 2020/0067981 A1* | 2/2020 | Ramachandra | H04L 43/08 |
| 2020/0084228 A1* | 3/2020 | Goutal | H04L 63/1416 |
| 2022/0053016 A1* | 2/2022 | Trost | H04L 63/1425 |
| 2022/0329604 A1* | 10/2022 | Guy | H04L 63/102 |
| 2023/0007047 A1* | 1/2023 | Guy | H04L 63/104 |

OTHER PUBLICATIONS

Kirovski, et al., "The Replacement Attack", IEEE Transactions on Audio, Speech and Language Processing, vol. 15, Issue: 6, Jul. 23, 2007, pp. 1922-1931.

* cited by examiner

*Primary Examiner* — Sanchit K Sarker
(74) *Attorney, Agent, or Firm* — Gilliam IP PLLC

(57) ABSTRACT

A system processes an API specification provided by a vendor to determine and classify the functions defined therein by CRUD operation type based on analysis of the function names. Classification of the function includes associating a bitmask corresponding to the class with the function name. The system then subscribes to an event stream including logged API function call events during a time window overlapping with a "blind spot" period of attack detection. The system analyzes incoming events to identify an associated resource and an API function call. The system classifies the function based on the determined function classes and performs a bitwise operation between bit values maintained for the identified resource that are indicative of resource state and the bitmask of the function class. If the resulting bit values indicate that the resource was both created and deleted during the time window, the system flags the resource as potentially involved in an attack.

20 Claims, 8 Drawing Sheets

DETECTION OF REPLACEMENT/COPY-PASTE ATTACKS THROUGH MONITORING AND CLASSIFYING API FUNCTION INVOCATIONS

BACKGROUND

The disclosure generally relates to digital data processing and to security arrangements for protecting computers.

Cloud service providers (CSPs) often provide logging services for logging events occurring in a customer's cloud environment. An event recorded in log data generally corresponds to a function call made in the cloud environment by or on behalf of the customer's program code to invoke functionality of one of the various services offered by the CSP via an application programming interface (API) exposed by the service. For instance, a service can be invoked via its API to facilitate provisioning cloud resources or updating/deleting existing cloud resources. A security vendor which provides security for the customer's cloud environment can obtain audit logs generated by a CSP audit logging service and/or periodically poll for log data which captures API function calls impacting resources across the cloud environment. Due to the distributed nature of cloud computing and resulting latencies, the appearance of recorded API invocations across services and different resources in log data generally is not instantaneous, nor can the security vendor obtain the associated log data immediately. Rather, API invocations made in the cloud environment may appear in log data which the security vendor obtains via auditing or API polling after a time delay, such as up to fifteen minutes.

Copy-paste or replacement attacks (also referred to herein as "attacks") occur when a resource which appears to be benign has been replaced with a malicious actor to perform a task, and once the malicious, replacement resource has performed the task, the resource is again replaced by the benign, original resource. As an example, a benign file can be replaced with a file comprising malicious code, and once the malicious code has executed, the benign file is restored. Due to rapid creation and deletion of resources supported by vendors, especially among CSPs, such attacks may be difficult to detect.

BRIEF DESCRIPTION OF THE DRAWINGS

Embodiments of the disclosure may be better understood by referencing the accompanying drawings.

DESCRIPTION

Figure 1:
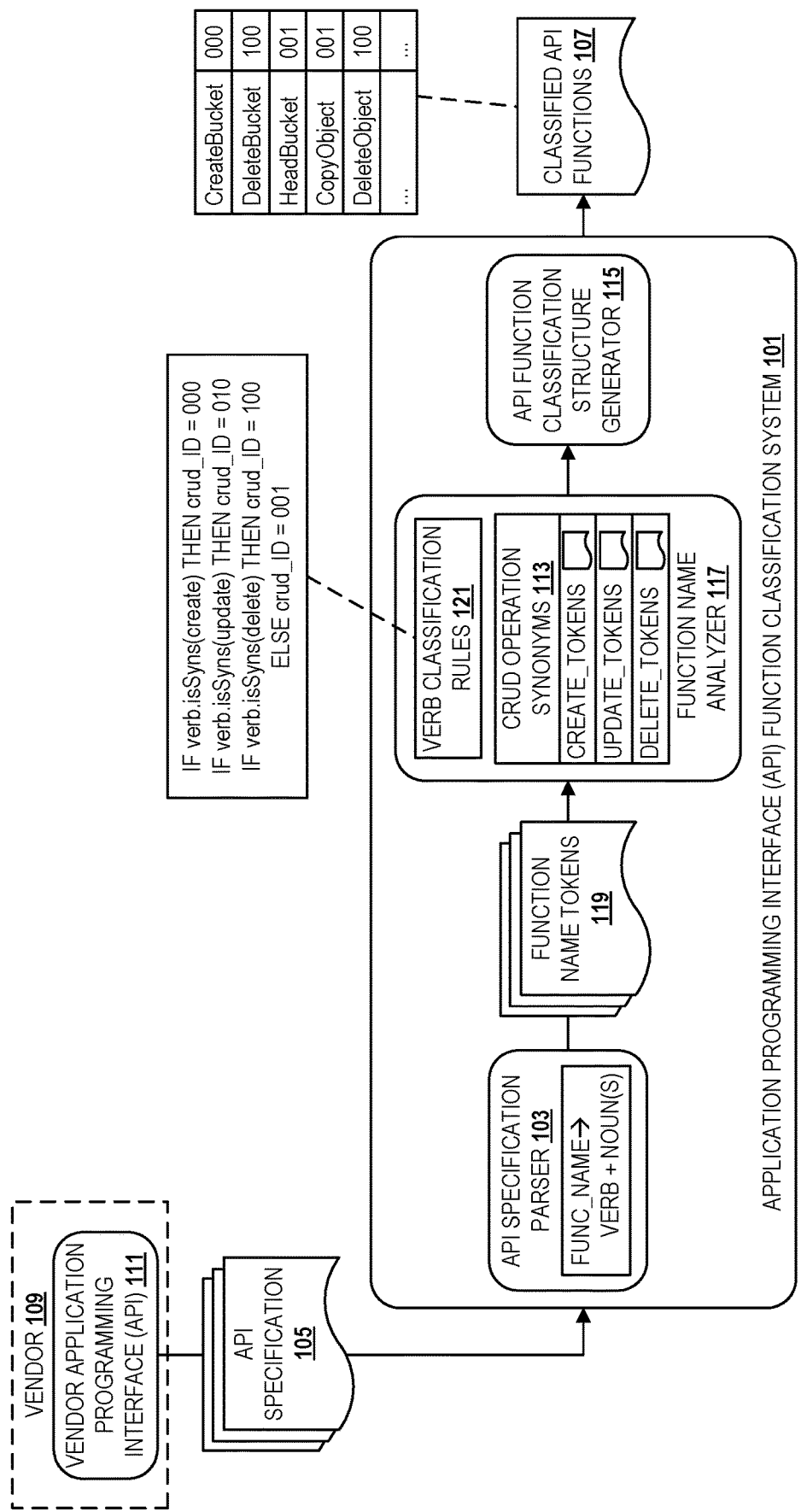
FIG. 1 depicts a conceptual diagram of processing an API specification to classify API functions by higher-level CRUD operation.

The description that follows includes example systems, methods, techniques, and program flows that embody aspects of the disclosure. However, it is understood that this disclosure may be practiced without these specific details. For instance, this disclosure refers to representing associations between function names and classes with a map data structure in illustrative examples. Aspects of this disclosure can be instead applied to other data structures which provide for storing data in key-value pairs. In other instances, well-known instruction instances, protocols, structures and techniques have not been shown in detail in order not to obfuscate the description.

Overview

Due to the time delay between calling an API function and logging the API function call in a cloud or Software-as-a-Service (SaaS) environments, "blind spot" periods can result. Blind spot periods are the periods during which API function calls may be made but will not appear in logs obtained via conventional log auditing or API polling, which are caused by latencies in event publishing and audit log delivery to a security vendor subscribing thereto. For instance, logging of API function calls may have an associated latency of fifteen minutes on average such that there is a fifteen minute delay between an API function call and the security vendor becoming aware of the API function call, such as a fifteen minute delay between a resource update event and the security vendor becoming aware of the update event. These blind spot periods can be exploited by attackers who carry out replacement/copy-paste attacks which involve rapid provisioning and destruction of resources during the blind spot period. As an example, the security vendor may identify a resource of interest based on analysis of audit logs; however, upon attempted investigation of the resource, the resource will no longer appear to exist due to the related attack being carried out during the blind spot period and the lack of indication of the resource deletion event in the audit logs as a result. Further information which could contribute to detection of the attack carried out via the resource is unavailable as a result. Additionally, due to the volume of resources and API function calls—especially among cloud services—manually tracking states of resources with respect to their creation and destruction on a large scale to attempt to identify attacks occurring within blind spots presents a challenge.

Automated tracking of creation and deletion of individual resources of a vendor, or a CSP or SaaS application which offers an API, based on streaming events during a time period overlapping with the blind spot period as disclosed herein facilitates detection of potential attacks. Tracking creation and deletion of resources based on API function calls which impact resources entails two stages. In an API function classification stage, a system parses and processes the API specification provided by the vendor to determine and classify the functions defined therein. The functions are classified by action/event type, where classes of action/event types correspond to the higher-level create, read, update, or delete ("CRUD") operation implemented by the functions within the class. The system analyzes the names of the functions to determine a type of resource associated with the function and the operation performed on that resource type, where the operation is classified as a CRUD operation or other operation type based on similarities to names of known CRUD operations. Bitmasks are used as class identifiers, where classification of the function into one of the classes includes associating the bitmask corresponding to the class with the function name.

In an attack detection stage, the system subscribes to an event stream from a logging service of the vendor which logs API function calls during a time window corresponding to the blind spot period. Each incoming event is analyzed to identify a resource impacted by the event and a function call made which resulted in generation of the event. The system classifies the function call based on the function classes determined in the first stage and performs a bitwise operation between bit values maintained for the identified resource that are indicative of resource state and the bitmask of the determined function class (e.g., a bitwise OR). If the updated bit values corresponding to a resource state indicate that the resource was both created and deleted during the time window as a result of determining that function calls within the classes of "create" and "delete" impacted the resource, the resource can be flagged as potentially involved in an attack.

Example Illustrations

FIG. 1 depicts a conceptual diagram of processing an API specification to classify API functions by higher-level CRUD operation. FIG. 1 depicts an API function classification system ("system") 101. The system 101 processes an API specification 105 of an API 111 published by a vendor 109 to classify each of a plurality of functions defined in the API specification 105 into a class corresponding to a higher-level CRUD operation. The vendor 109 may be a CSP, a vendor of a SaaS application, or any other provider of a service which has an API. The system 101 includes an API specification parser ("parser") 103, a function name analyzer ("analyzer") 117, and an API function classification structure generator ("structure generator") 115. The parser 103 parses an API specification to generate a format of the API specification by which individual function names defined therein can be accessed and further tokenized to split the function names into words of which they are comprised. The analyzer 117 identifies the tokens from parsed function names which correspond to verbs and classifies each verb into one of a set of classes which represent create events, update events, delete events, and other events. The structure generator 115 builds a file or data structure which indicates classes of each of the function names identified in the API specification.

The system 101 obtains the API specification 105 from the vendor 109. The vendor 109 may provide a function of the API 111 by which the API specification 105 can be requested and obtained, or the vendor 109 may offer the API specification 105 for download. The system 101 can obtain the API specification 105 based on invoking this function of the API 111 or based on downloading the API specification 105 from the vendor 109. The API specification 105 can include one or more files comprising structured data. The structured data may at least include a name and a request/response schema for each operation (i.e., function) of the API. For instance, the API specification 105 can comprise a file(s) for one or more services offered by the vendor 109 having an API, where the API specification for each service is represented with JSON structured data.

The parser 103 parses the API specification 105 such that function names included therein can be accessed. As an example, if the API specification 105 is represented with JSON or another format by which data are represented as key-value pairs, the parser 103 may load the JSON file(s) and generate a dictionary structure or other data structure by which individual values can be accessed via their associated keys. Since names of keys used to denote function names can vary across vendors, the parser 103 may have been configured to identify a key name known to be used in the API specification 105 based on an identity of the vendor 109. Subsequent operations can be performed iteratively for each of the function names identifiable from the parsed representation of the API specification 105 or in stages, where each of the function names are processed at a respective stage.

The parser 103 splits key-value pairs corresponding to the function names to separate the function name values from their respective keys. The parser 103 then splits each function name into tokens representing words which form the function name to generate function name tokens 119. The manner in which the parser 103 splits the function names into words may be dependent on the identity of the vendor 109 and how the vendor 109 represents API functions in the API specification 105 (e.g., with camel case or paths). Generally, API function names comprise a verb and may include one or more nouns, where the verb specifies an action and the noun(s) can specify a resource. Splitting the function names into words therefore splits the function names into their respective verb-noun combinations. For example, for a function named "CopyObject," splitting the function name into words yields individual tokens corresponding to the words "Copy" and "Object," where "Copy" is a verb specifying a copy action and "Object" is a noun specifying an Object resource. The function name tokens 119 which the parser 103 generates comprise the tokenized API function names represented as verb/verb-noun combinations.

For each function name represented in the function name tokens 119, the analyzer 117 classifies the corresponding verb into one of a set of classes representing create actions, update actions, delete actions, and other actions, which roughly correspond to CRUD-type actions. For each of the function names and corresponding ones of the function name tokens 119, the analyzer 117 determines which of the function name tokens 119 correspond to a verb. Determining which of the function name tokens 119 correspond to a verb can be based on known ordering of verbs and nouns for API function names defined by the vendor 109. As an example, for the API 111 of the vendor 109, function names may comport to a format in which the verb is the first word and the resource name is the second word(s), as is the case with "CreateObject." In other examples, the analyzer 117 can implement part-of-speech tagging to determine which of the function name tokens 119 correspond to verbs and the noun(s) which are associated with each verb.

The analyzer 117 then determines how to classify each verb based on verb classification rules ("rules") 121. In this example, the rules 121 indicate that classification of verbs is based on whether a verb is synonymous with create, update, or delete, and if the verb is not synonymous with any of these operation types, the verb should be classified as "other." For each verb, the analyzer 117 analyzes the verb based on sets of CRUD operation synonyms ("synonyms") 113. The synonyms 113 comprise sets of synonyms for each of create, update, and delete operations. As an example, the synonyms 113 can include "provision" and "remove" in the sets of synonyms of create operations and delete operations, respectively. The analyzer 117 determines whether the verb is included in any of these sets of synonyms and, if so, classifies the associated function name into the respective class. For instance, returning to the example of "CreateObject," the analyzer 117 can determine that "Create" is included in the set of synonyms for create operations and classifies the function name "CreateObject" into the class representing create operations. If the verb is not synonymous with any of the create, update, or delete operations, the analyzer 117 classifies the verb into the class of other operation types.

Classes into which verbs can be classified as designated by the rules 121 can be associated with a bitmask, or binary representations of integers which are used for performing bitwise operations (also referred to as "masking"). In this example, the classes of create, update, delete, and other operations are denoted with bitmasks of 000, 010, 100, and 001, respectively. Classifying a function name into a class based on analysis of the verb can include associating an indication of the bitmask which identifies the class with the verb or the function name (e.g., as an attribute value of the function name, by creating a key-value pair, etc.). Classifying each of the function names identified from the API specification 105 by the analyzer 117 allows for distinguishing between functions which can be called to create a resource, update a resource, delete a resource, or perform another operation on a resource.

The structure generator 115 generates a structure 107 which indicates the determined classes of the functions of the API 111. The structure 107 may be any data structure or structured data representation which provides for associating names of functions with the bitmask representing their corresponding class. In this example, the structure 107 comprises a map data structure in which the function names are keys, and the values are the bitmasks. To generate the structure 107, as the analyzer 117 classifies based on the rules 121, the structure generator 115 adds key-value pairs indicating the function names and corresponding classes to the structure 107. The structure generator 115 can add indications of functions and their classes to the structure 107 through insertion, appending, etc. depending on the data structure or structured data used to represent the classified API functions. The structure 107 which results maps each of the functions of the API 111 to a higher-level class of operation which the function implements. Events corresponding to API function calls which are subsequently detected at runtime can therefore efficiently be classified as corresponding to one of resource creation, resource update, resource deletion, or another operation on a resource based on performing a lookup of the function name in the structure 107 as is now described in reference to FIG. 2.

Figure 2:
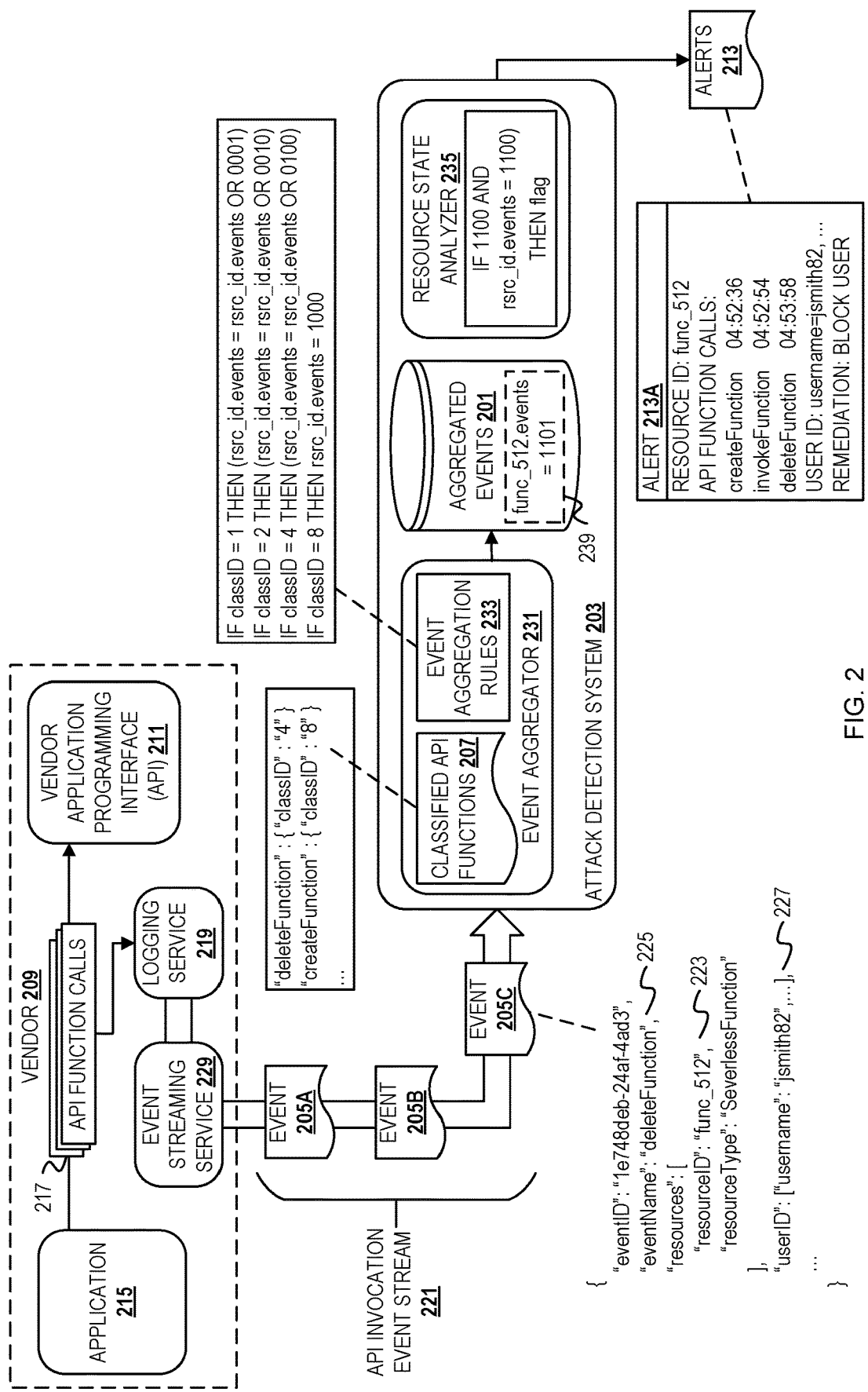
FIG. 2 depicts a conceptual diagram of automated detection of potential attacks occurring during a blind spot period.

FIG. 2 depicts a conceptual diagram of automated detection of potential attacks occurring during a blind spot period. FIG. 2 depicts an application 215 which utilizes services of a vendor 209. As described in reference to FIG. 1, the vendor 209 may be a vendor of a CSP, a provider of a SaaS application, or another entity or provider of a service which offers an API. The application 215 may thus be an instance of the SaaS application offered by the vendor 209 which serves a tenant, a cloud application running on a cloud provided by the vendor 209, etc. Code of the application 215 can invoke functionality provided by the vendor 209 via an API 211 of the vendor. Function calls 217 made by the application 215 to the API 211 are logged as events by a logging service 219. The logging service 219 is a logging service implemented or provided by the vendor 209.

FIG. 2 also depicts an attack detection system ("system") 203. The system 203 detects potential attacks based on streaming events logged by the logging service 219, determining the classes of the associated function calls and the impacted resources, and tracking states of the impacted resources based on the classes of function calls. The state of a resource refers to an aggregation of the types of operations which have been performed on that resource, where the different types of operations correspond to the classes of function calls determined as described in reference to FIG. 1. Example states of a resource include created, created and updated, and created, updated, and deleted.

The logging service 219 has an event streaming service 229 by which the logging service 219 can publish events corresponding to logged API function calls to an API invocation event stream ("event stream") 221. The event streaming service 229 is a service provided by the vendor 209 which provides for generation of a data stream, where data points in the stream are events logged by the logging service 219 which correspond to detected calls to functions of the API 211. The event streaming service 229 has been configured to publish API function calls logged by the logging service 219 to the event stream 221. The system 203 subscribes to the event stream 221 via the event streaming service 229 to receive events during a time window corresponding to or overlapping with a blind spot period (e.g., a fifteen minute time window), where the logging service 219 may also have been configured to publish events to the event stream 221 during this time window. The time window may be a sliding time window of a configurable interval of time which corresponds to known latencies incurred during API function call logging in the environment of the vendor 209. As the logging service 219 logs the function calls 217 as events, the logging service 219 publishes the events to the event stream 221 for communication to the system 203.

In this example, the logging service 219 publishes events 205A, 205B, 205C (collectively the "events 205A-C") to the event stream 221 received by the system 203. Each of the events 205A-C comprises log data generated by the logging service 219 when logging a respective one of the function calls 217. The events 205A-C may comprise structured data (e.g., represented with JSON) which describes the corresponding API function call event. The data of the event 205C, which is depicted in additional detail, comprises an event name 225, a resource identifier (ID) 223, and user ID information 227. The event name 225 indicates the name of the API function which was called and resulted in generation of the event 205C. The resource ID 223 is an identifier of the resource which was impacted/affected by the API function call indicated by the event name 225. The user ID information 227 indicates identifying information of the user account from which the API function call originated. In this example, the event name 225 and resource ID 223 are "deleteFunction" and "func_512," respectively. The resource identified as "func_512" may thus be a serverless function which was deleted through invocation of a function of the API 211 named "deleteFunction."

An event aggregator 231 of the system 203 aggregates events of the event stream 221 to generate aggregated events 201. The aggregated events 201 may be a repository or other data store or structure that can be keyed or indexed by resource ID. The event aggregator 231 aggregates events by resource ID such that the aggregated events 201 tracks operations which have been performed on the identified resources. The indication of aggregated events maintained for a resource can be represented as a sequence of bit values representing Boolean values indicative of the classes of operations which have been performed on the resource, where each bit position represents a class of operation corresponding to a bitmask associated with that class in the structure 207. As similarly described in reference to FIG. 1, the structure 207 comprises indications of functions of the API 211 and their corresponding classes, where the classes roughly correspond to CRUD operations and are associated with a bitmask as a class identifier. Based on detection of an event indicating a resource ID and an API function which was called, the event aggregator 231 updates the indications of aggregated events maintained for that resource ID in accordance with event aggregation rules ("rules") 233. The rules 233 indicate creation or updates of aggregated events indicated for a resource ID which the event aggregator 231 should make based on determining the class of the function indicated in the structure 207.

The rules 233 indicate classes of API functions corresponding to events which may be determined from the event stream 221 and an associated update to aggregated event indications which the event aggregator 231 should make. The event aggregator 231 can thus aggregate events per resource based on determining a resource ID indicated in an event, determining the name of the API function that was called, referencing the structure 207 to determine the class of the API function and associated bitmask, and adding/updating an entry of the aggregated events 201 for the resource ID with the bitmask of the API function class according to the rules 233. The entry for the resource ID can be created if the resource ID is not yet indicated in the aggregated events 201 (i.e., the API function has a class corresponding to creation/provisioning of resources) and updated if the resource ID is already indicated in the aggregated events. A sequence of bit values maintained for the entry which represents the aggregated events for the resource ID can thus be initialized or updated based on the rules 233. As indicated by the rules 233, aggregated event updates can include performing a bitwise OR on the existing bit values maintained for the resource with the bitmask corresponding to the function class. Utilizing bit values to represent aggregations of events and bitmasks to represent classes of operations performed on resources thus allows for performing bitwise operations to track and update resource states.

With reference to the event 205C, based on receiving the event 205C, the event aggregator 231 determines the event name 225 which corresponds to the function of the API which was invoked. For instance, the event aggregator 231 can parse the event 205C (e.g., if the event is represented as JSON data) and access the name of the API function via its associated key, or the key "eventName" in this example. The event aggregator 231 may have been configured to identify a key name known to be used for events generated by the logging service 219 based on an identity of the vendor 209. The event aggregator 231 determines a class of the API function which was called based on identifying the class associated with the API function name in the structure 207. The structure 207 may be searchable or indexable by event name or parsed event name to facilitate quick lookups of API function classes, where each class is associated with a bitmask representing the class. In this example, the function name "deleteFunction" is associated with a bitmask of 100 representing the class of functions which implement delete operations in the structure 207.

The event aggregator 231 also determines the resource ID associated with the events such that events can be aggregated by resource ID. For the event 205C, the event aggregator 231 determines the resource ID 223 which was impacted by the call to "deleteFunction." The event aggregator 231 updates indications of aggregated events 239 maintained for the resource ID 223 in a corresponding entry of the aggregated events 201 based on the operation indicated in the rules 233. The indications of aggregated events 239 and other indications of aggregated events maintained stored in the aggregated events 201 may a field, attribute, etc. of the respective entries of the aggregated events 201. Because the class ID determined for the event 205C is 4, or 100 in binary, the event aggregator 231 performs a bitwise OR on the existing bit values of the indications of aggregated events 239 and the binary value 100, which flips the bit in the corresponding position to 1 representing a value of "true" for whether the resource corresponding to the resource ID 223 has been impacted by a delete operation.

The resource state analyzer 235 analyzes states of resources reflected in the bit values maintained per resource ID in the aggregated events 201 to determine whether any of the resources have undergone both creation and deletion within the time window and thus may have been used to carry out an attack. The resource state analyzer 235 can make this determination for the resource ID 223 based on whether the updated bit values indicate a value of "true" in the bit positions corresponding to the classes of create and delete operations (e.g., based on performing a bitwise AND with the binary values 0100 and 1000). Because the values of both the bit positions corresponding to the class of delete operations and the class of create operations have a value of "true," the resource state analyzer 235 determines that the resource with resource ID 223 was both created and deleted during the time window corresponding to the blind spot period and was potentially involved in an attack.

The system 203 generates alerts 213 which indicate the resource(s) determined by the resource state analyzer 235 to have been created and deleted during the blind spot period. For instance, the system 203 may generate the alerts 213 by generating a notification, report, etc. A first of the alerts 213, an alert 213A, indicates the alert generated for the resource "func_512" having resource ID 223. The alert 213A indicates the resource ID 223 and the associated calls to the API 211 which were made. The alert 213A also indicates the user ID information 227, which is information associated with the account of the vendor 209 from which the identified function calls to the API 211 were initiated. As depicted in this example, the alerts 213 may also indicate a suggested action to take for attack remediation or to prevent similar attacks in the future. The alert 213A indicates a suggested action of blocking the user identified by the user ID information.

Figure 3:
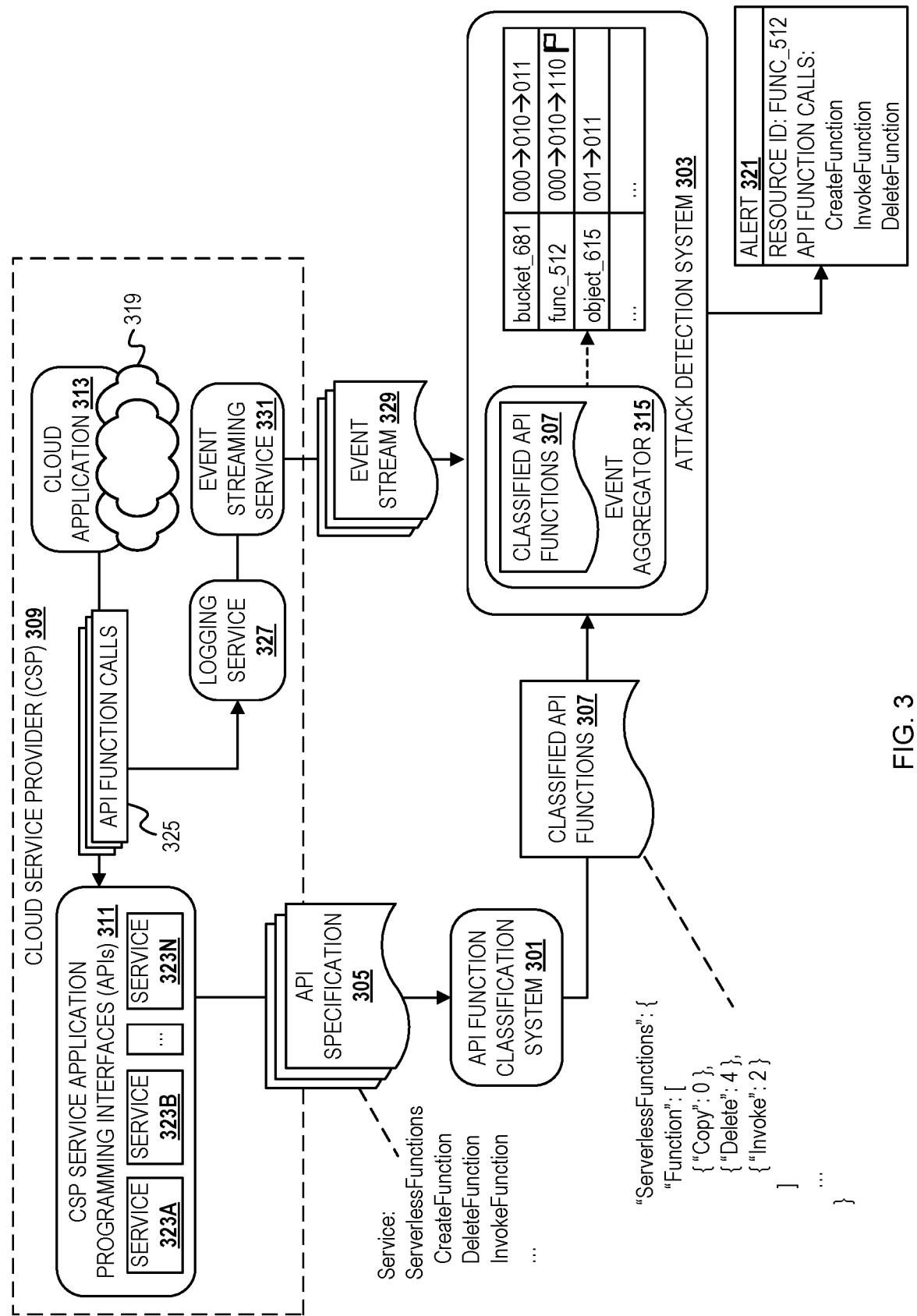
FIG. 3 depicts a conceptual diagram of classifying functions of an API of a CSP and leveraging the function class information for detection of potential attacks in a cloud environment occurring during a blind spot period.

FIG. 3 depicts a conceptual diagram of classifying functions of an API of a CSP and leveraging the function class information for detection of potential attacks in a cloud environment occurring during a blind spot period. FIG. 3 depicts an example use case of an API function classification system ("classification system") 301 and an attack detection system ("detection system") 303 in which the API is one published by a CSP 309. A cloud application 313 runs on a cloud 319 offered by the CSP 309. The cloud application 313 can invoke functionality of services 323A-N of the CSP 309 by calling functions of an API 311 offered by the CSP 309. An API specification 305 of the API 111 includes an example service of the CSP 309 named "ServerlessFunctions" having example functions named "CreateFunction," "DeleteFunction," and "InvokeFunction." A logging service 327 of the CSP 309 logs API function calls 325 made by the cloud application 313 to the API 311, where each of the API function calls 325 can be recorded/logged as an event. Event data/metadata logged for each of the API function calls 325 may include a resource identifier (ID) of a resource affected or manipulated by the function call, a user ID associated with an account of the CSP 309 from which the function call originated, etc.

The classification system 301 obtains the API specification 305 (e.g., based on downloading the API specification 305 from the CSP 309). The classification system 301 parses the API specification 305, determines the functions named in the API specification 305, and classifies each of the determined functions into one of several classes representing CRUD operations or other operation types as similarly described in reference to FIG. 1. As also described in reference to FIG. 1, as a result of classifying the functions of the API 311, each of the function names is associated with a bitmask corresponding to their class as a result of classification. In this example, "CreateFunction" is assigned a bitmask of 0, "DeleteFunction" is assigned a bitmask of 4, and "InvokeFunction" is assigned a bitmask of 2, or 000, 100, and 010 in binary, respectively. These bitmasks indicate that each of "CreateFunction", "DeleteFunction", and "InvokeFunction" belong to different classes of operations, such as classes of create operations, delete operations, and other operations. The classification system 301 creates a structure 307 which indicates names of functions of the API 311 and their corresponding classes represented by the bitmasks.

The CSP 309 provides an event streaming service 331 which facilitates publishing of events, or API function calls logged by the logging service 327 in this example, to an event stream 329. The detection system 303 processes and analyzes the event stream 329 for detection of potential copy-based/replacement style attacks occurring in the cloud 319. The event stream 329 comprises events corresponding to the API function calls 325 which are logged by the logging service 327 and published to an event stream to which the detection system 303 subscribes. As the detection system 303 receives events of the event stream 329, an event aggregator 315 of the detection system 303 aggregates events by affected (i.e., created, updated, deleted, or otherwise modified/accessed) resource. Aggregation of events by resource ID provides for grouping of events which impact the same resource so that the state of the resource can be tracked over the course of events. As part of aggregating events, the event aggregator 315 identifies the API function indicated in the event data and determines its class indicated in the structure 307. The event aggregator 315 also determines the ID of the resource impacted by the API function call, such as based on a value of a field of a respective one of the events of the event stream 329 which indicates a resource ID associated with the event.

The detection system 303 maintains bit values associated with each resource ID identified in the event stream 329, where the bit values indicate an aggregation of events in which the corresponding one of the resources has been involved. As function classes associated with incoming events and the associated resource IDs are determined, the event aggregator 315 performs bitwise operations using the bitmask associated with the function classes and the bit values associated with the resource IDs. For instance, based on determining an API function call corresponding to an event, an ID of an impacted resource, and the associated class of the API function, the event aggregator 315 can perform a bitwise OR between bit values maintained in association with the resource ID indicating an aggregation of API function call types which have impacted that resource and a bitmask corresponding to the API function class to flip the bit in the bit position corresponding to the bitmask. Flipping a bit in a bit position corresponding to a bitmask, or setting that bit to "true," indicates that an API function call associated with the class/type indicated by the bitmask has impacted the resource with the associated resource ID.

If the detection system 303 detects that the aggregated events indicated by bit values maintained for a resource ID are indicative of creation and deletion of the resource during the time window of event streaming, the detection system 303 flags the resource ID and can generate an alert 321 which indicates the resource ID and associated API function calls affecting that resource. In this example, the detection system 303 determines that the aggregated events for the resource having resource ID "func_512" indicate creation and deletion of the resource during the time window. The detection system 303 thus generates the alert 321 which indicates the resource "func_512" and function calls to the API 311 which impacted the resource. The function "func_512" may thus be a serverless function which was created, invoked for execution of malicious code, and quickly deleted during the blind spot period.

FIGS. 4-7 depict example operations for detection of copy-replace attacks based on monitoring and classifying API function invocations. The example operations are described with reference to an API function classification system or an attack detection system (hereinafter the "classification system" and the "detection system," respectively) for consistency with the earlier figures. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

Figure 4:
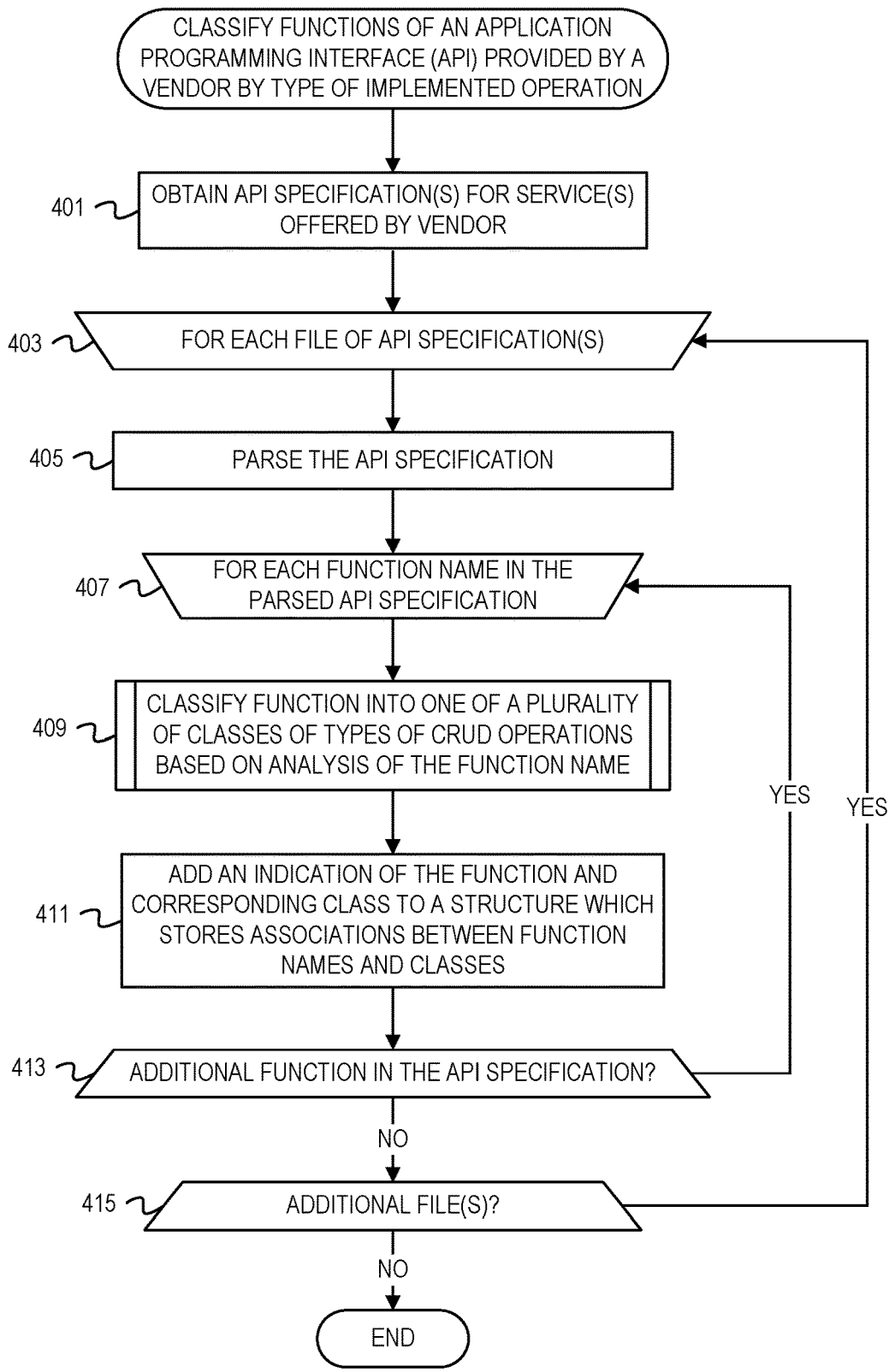
FIG. 4 depicts a flowchart of example operations for classifying functions of an API provided by a vendor by type of implemented operation.

FIG. 4 depicts a flowchart of example operations for classifying functions of an API provided by a vendor by type of implemented operation. The example operations are described as being performed by the classification system.

At block 401, the classification system obtains an API specification(s) for one or more services offered by a vendor. The vendor may publish one API specification or a plurality of API specifications which each correspond to an API exposed by a different service offered by the vendor. The API specification(s) may comprise one or more files which include structured data, such as structured data represented with JSON, which indicate at least function names and a request/response schema for the functions. The classification system may obtain the API specification(s) by downloading the API specification(s) from the vendor.

At block 403, the classification system begins iterating over each file which was obtained. For instance, if the vendor published an API specification per service, where the service API specifications are packaged individually, the classification system iterates over each file for a corresponding service.

At block 405, the classification system parses the API specification. Parsing the API specification can include loading the file and converting the file to a structure or format by which the classification system can access individual elements (e.g., key-value pairs) of the API specification, such as a dictionary or other data structure.

At block 407, the classification system begins iterating over each function name in the parsed API specification. The classification system may iterate over the indications of function names based on a set of keys determined to correspond to function names. For instance, the classification system can determine which of the keys among the key-value pairs of the parsed API specification correspond to function names and access the function name values based on known naming conventions used by the vendor. The classification system can store the function name in a variable for further manipulation.

At block 409, the classification system classifies the function into one of a plurality of classes of types of CRUD operations based on analysis of the function name. The classification system splits the function name into tokens representing individual words of the function based on patterns/naming conventions used by the vendor in the API specification (e.g., splitting by camel case, splitting based on delimiters used in a path specifying the function name, etc.). The classification system then determines a CRUD operation type implemented by the function based on the verb identified from the function name, where the verb is also distinguished from the noun(s) based on the patterns/naming conventions used for function names. For instance, the classification system can compare the verb to sets of tokens corresponding to create operation types, update operation types, and delete operation types, and classify the function accordingly based on the verb matching a token in one of the sets. In other examples, the classification system can utilize part-of-speech tagging to determine the verb and then determine its synonyms as well as whether the synonyms match to a CRUD operation. Alternatively, if the verb does not match any of the tokens, the function can be classified into a class of other function types.

Classifying the function can also include associating a bitmask unique to the determined class with the function name. Each of the classes of CRUD operation types or other operation types (e.g., classes of create, delete, update, and other operations) may be associated with a bitmask, such as 000 for create, 100 for delete, 001 for update, and 010 for other. Associations between classes of operation types and bitmasks can be specified in rules or policies maintained by the classification system. The classification system can determine the bitmask corresponding to the determined class (e.g., based on the rules of policies) and associate the bitmask with the function by adding the bitmask as an attribute of the function name, creating a key-value pair which associates the function name with the identifier, etc. Classification of a function into a class representing the type of CRUD operation implemented by the function is described in further detail in FIG. 5.

At block 413, the classification system adds an indication of the function and the corresponding class to a structure which stores associations between function names and classes. The structure can be structured data stored in a file (e.g., structured data represented with JSON) or a data structure by which function names can be associated with bitmasks identifying the classes of the function. For instance, the classification system can create a key-value pair that is added to (e.g., inserted into, appended onto, etc.) a map data structure in which one or more tokens of the function name is used as a key and the class as the corresponding value. The structure can be indexable or keyable by at least part of the API function name to access the bitmasks stored therein.

At block 413, the classification system determines if an additional function is indicated in the API specification. If an additional function is indicated in the API specification, operations continue at block 407. If there are no additional functions indicated in the API specification, operations continue at block 415.

At block 415, the classification system determines if an additional file(s) is remaining. If there is an additional file remaining, such as a file comprising a specification of an API of another service, operations continue at block 403. If there are no additional files remaining, operations are complete.

Figure 5:
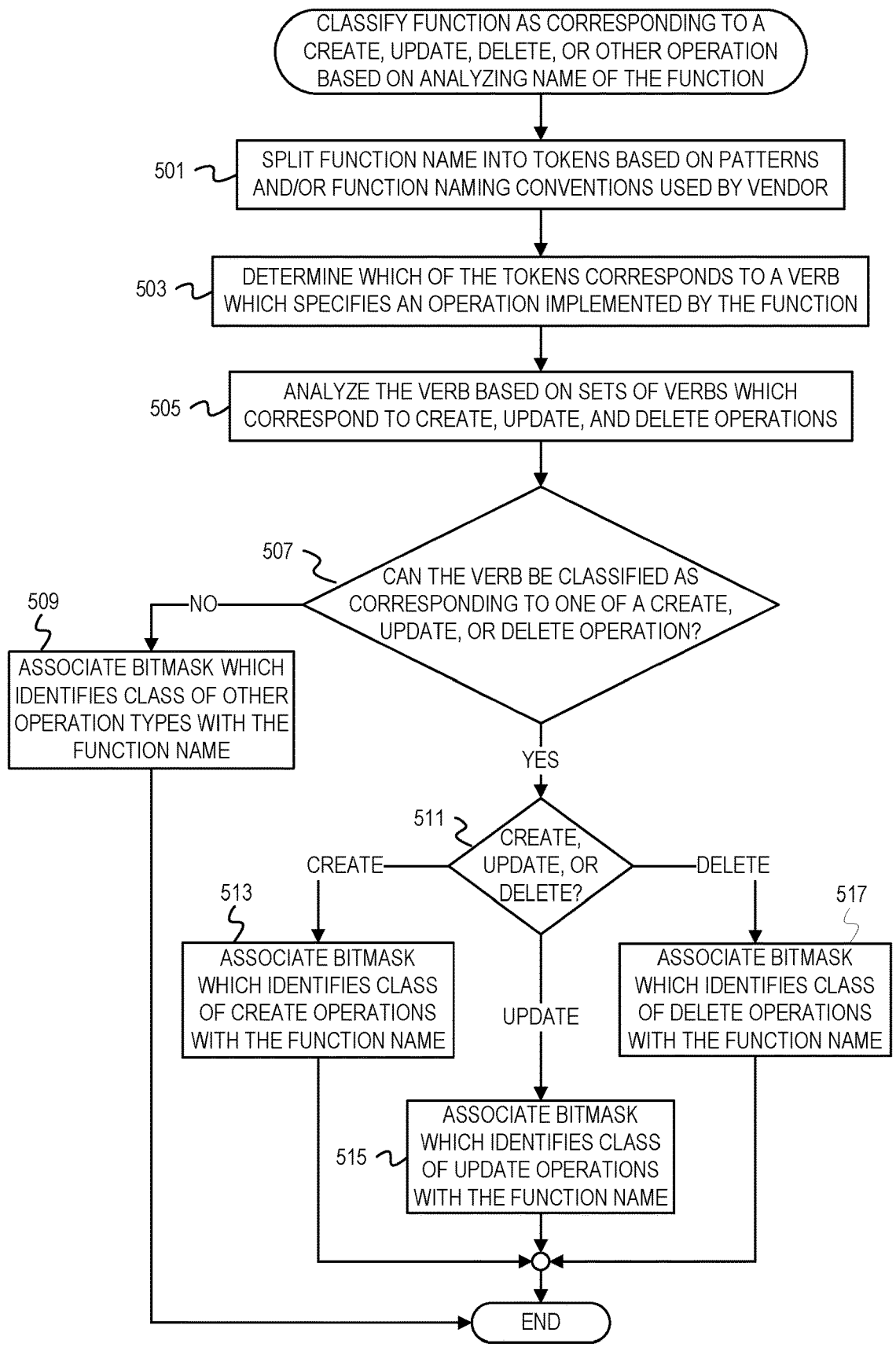
FIG. 5 is a flowchart of example operations for classifying a function as corresponding to a create, update, delete, or other operation based on analyzing the name of the function.

FIG. 5 is a flowchart of example operations for classifying a function as corresponding to a create, update, delete, or other operation based on analyzing the name of the function. The example operations are described as being performed by the classification system. The example operations assume that an API specification provided by a vendor has been obtained and parsed and that a function name has been identified from the specification (e.g., as described in FIG. 4).

At block 501, the classification system splits the function name into tokens based on patterns and/or function naming conventions used by the vendor. The classification system splits or parses the function name into tokens which correspond to words forming the function name. The function name may be composed of a word indicating an operation to perform on a resource and a noun(s) indicating the resource. Because representations of function names in the API specification can vary among vendors, the technique which the classification system leverages to split the function name may be based on the identity of the vendor. For instance, a first vendor may represent API function names using camel case, where words or names of resources/operations are separated by camel case (e.g., copyFile). The classification system could split the function name based on the cases of characters in the function name. As another example, a second vendor may represent API function names with paths, where words or names of resources/operations are separated by a delimiter in the path (e.g., /file/copy). The classification system could split the function name based on the delimiter.

At block 503, the classification system determines which of the tokens corresponds to the verb which specifies an action/operation. The classification system can determine the token corresponding to the verb and store it in a variable for further manipulation based on the patterns or function naming conventions. For instance, the verb may be the last word in the path for path representations of API function names or the first word in a function name represented with camel case, as is the case with /file/copy and copyFile, respectively. As another example, the classification system may implement part-of-speech tagging to distinguish the token(s) corresponding to the verb from other tokens. The classification system may comprise a part-of-speech tagger which reads the parsed function name and assigns part of speech tags to each word/token so that the words corresponding to verbs can be identified.

At block 505, the classification system analyzes the determined verb based on sets of verbs which correspond to create, update, and delete operations. The classification system can maintain a set of tokens corresponding to names of create operations, a set of tokens corresponding to names of update operations, and a set of tokens corresponding to names of delete operations. The sets of tokens may be lists or other data structures by which the names of operations can be enumerated. The sets of tokens for each operation type comprise synonyms of that operation type. For instance, the sets of tokens corresponding to names of create operations can include "create," "provision," "new," etc., and the sets of tokens corresponding to names of delete operations can include "delete," "destroy," "remove," etc. The classification system can analyze the verb by evaluating the verb against the sets of tokens to determine if the verb matches any of the tokens and is thus synonymous with the operation type represented by the corresponding set of tokens. In other examples, the classification system can analyze the determined verb by searching a dictionary, including as part of part-of-speech tagging, for verb classification. In such cases, the classification system searches the dictionary for the determined verb and identifies synonyms of the verb based on results of the searching the dictionary for the determined verb.

At block 507, the classification system determines if the operation can be classified as corresponding to one of a create, update, or delete operation. The function can be classified into a class of create, update, or delete operations based on similarity of the verb to CRUD contexts or can be classified into a class of other operation types if a similar CRUD operation cannot be identified. The classification system can determine that the operation can be classified as corresponding to one of a create, update, or delete operation rather than a different/other operation type if the verb could be identified among the create, update, or delete operation types based on which it was analyzed at block 505. As another example, if a dictionary was utilized to determine synonyms of the verb, the classification system can determine if at least a first of the synonyms identified from the dictionary matches a known CRUD operation, such as the known CRUD operations indicated by the sets of CRUD tokens maintained by the classification system. For instance, the classification system can determine that the operation can be classified as create, update, or delete based on the synonym(s) identified from the dictionary matching one of create, update, delete, or another known synonym thereof. If the operation cannot be classified as corresponding to one of a create, update, or delete operation, operations continue at block 509. If the operation can be classified as corresponding to such, operations continue at block 511.

At block 509, the classification system associates a bitmask which identifies a class of other operation types with the function name. The classification system may maintain rules or policies which indicate the classes of operation types and corresponding bitmasks. The classification system can determine which of the bitmasks corresponds to the class of other operation types based on the rules or policies and associates that bitmask with the function name. The bitmask may be associated with the function name by adding the bitmask as an attribute of the function name or creating a key-value pair which indicates the function name and bitmask, for example. Verbs corresponding to other operation types may be flagged for further analysis to determine if a corresponding CRUD operation type can be identified for the verb such that the sets of tokens can be updated with the verb for subsequent classification events.

At block 511, the classification system determines if the verb can be classified as corresponding to a create operation, an update operation, or a delete operation. The class representing the type of operation can be determined based on which of the create, update, or delete operation types was identified at block 505. If the verb can be classified as corresponding to a create operation, operations continue at block 509. If the verb can be classified as corresponding to an update operation, operations continue at block 515. If the verb can be classified as corresponding to a delete operation, operations continue at block 517.

At block 513, the classification system associates a bitmask which identifies a class of create operations with the function name. The classification system can determine which of the bitmasks corresponds to the class of create operation types based on the rules or policies which it maintains and associates that bitmask with the function name. The bitmask may be associated with the function name by adding the bitmask as an attribute of the function name or creating a key-value pair which indicates the function name and bitmask, for example.

At block 515, the classification system associates a bitmask which identifies a class of update operations with the function name. The classification system can determine which of the bitmasks corresponds to the class of update operation types based on the rules or policies which it maintains and associates that bitmask with the function name. The bitmask may be associated with the function name by adding the bitmask as an attribute of the function name or creating a key-value pair which indicates the function name and bitmask, for example.

At block 517, the classification system associates a bitmask which identifies a class of delete operations with the function name. The classification system can determine which of the bitmasks corresponds to the class of delete operation types based on the rules or policies which it maintains and associates that bitmask with the function name. The bitmask may be associated with the function name by adding the bitmask as an attribute of the function name or creating a key-value pair which indicates the function name and bitmask, for example.

Figure 6:
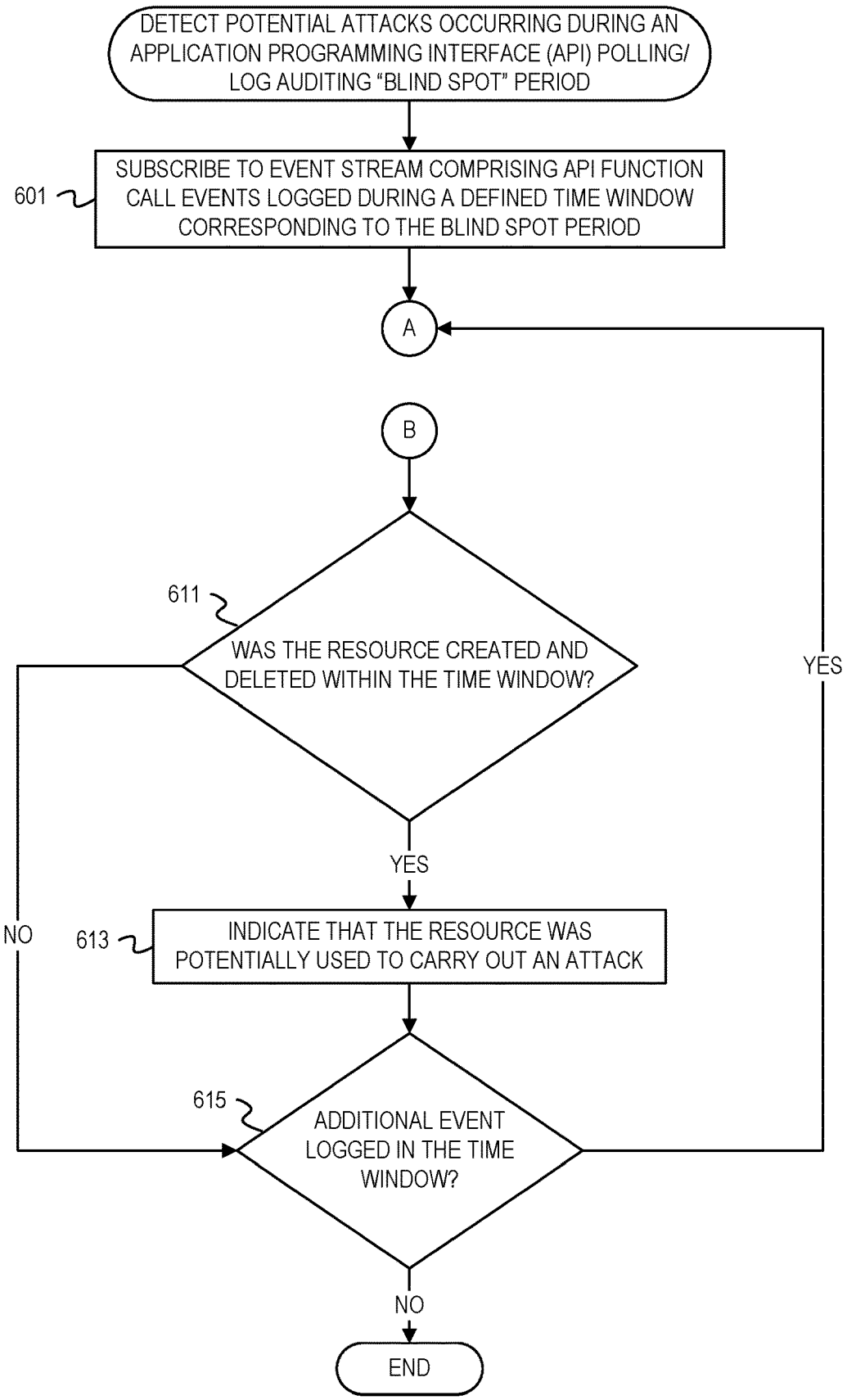
FIGS. 6-7 are a flowchart of example operations for detecting potential attacks occurring during a "blind spot" period of API polling or log auditing.
Figure 7:
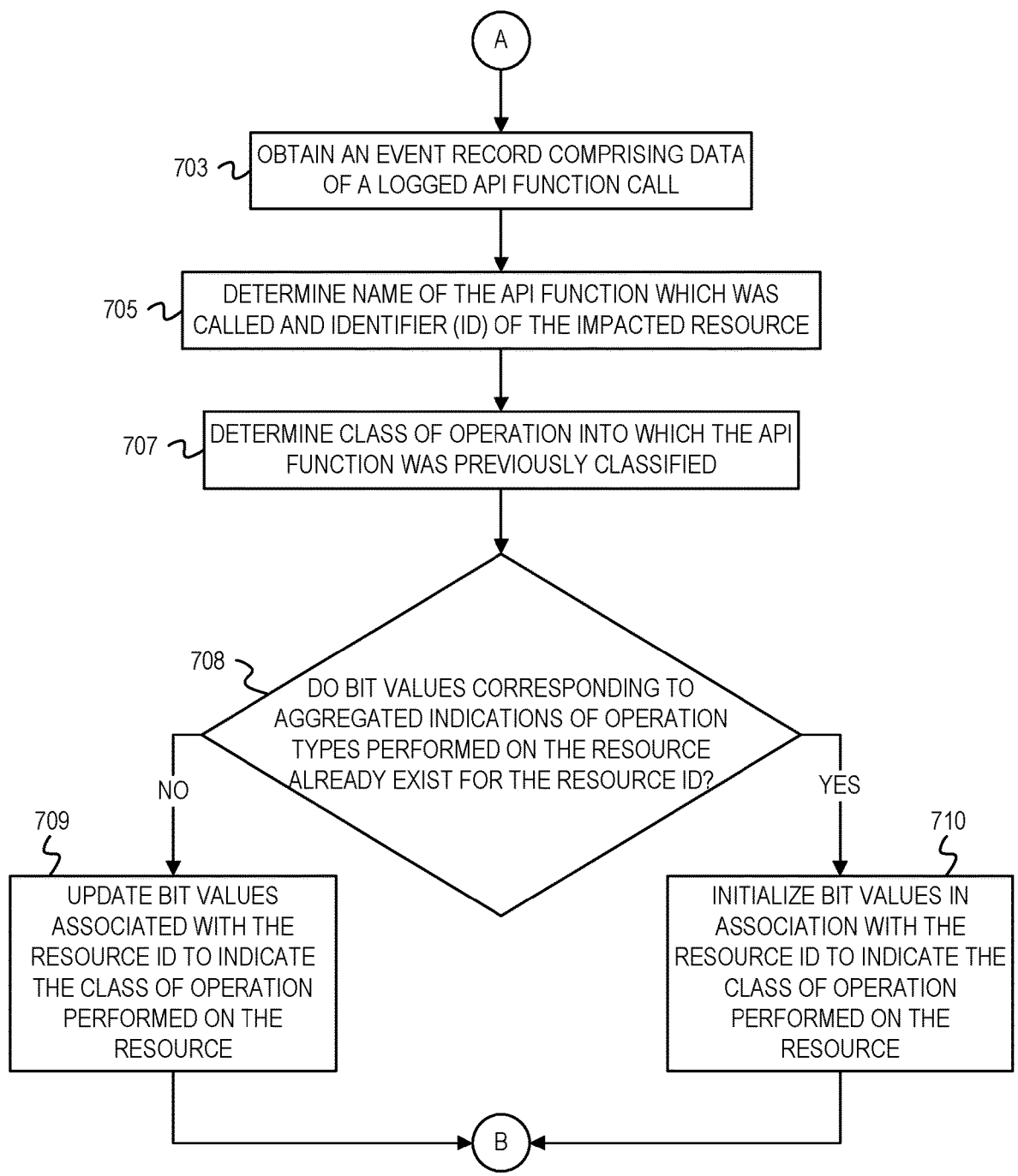

FIGS. 6-7 are a flowchart of example operations for detecting potential attacks occurring during a "blind spot" period of API polling or log auditing. The example operations are described as being performed by the detection system.

At block 601, the detection system subscribes to an event stream comprising API function call events logged during a defined time window corresponding to the blind spot period. A logging system of a vendor which provides resources being monitored has been configured to publish events corresponding to logged API function calls to an event stream via an event streaming service offered by or installed on the vendor. The detection system is thus configured to subscribe to this event stream such that events communicated during the streaming session are received by the detection system. The detection system subscribes to the event stream during a configurable window of time which should overlap or correspond to the blind spot period so that events are received as part of the event stream during the time which may not be accounted for in API poll or log audit data (e.g., a 10 minute streaming window, a 15 minute streaming window, etc.). The time window for event streaming is a moving window such that the detection system can collect data of the events occurring during a defined, controlled time window for analysis, and the time window can be incremented for subsequent analyses (e.g., for subsequent performance of the operations of FIGS. 6-7). Operations continue at transition point A, which continues at block 703 of FIG. 7.

At block 703, the detection system obtains an event record comprising data of a logged API function call. The detection system obtains the event record corresponding to a logged API function call published to the data stream of events by the logging service of the vendor. The event record at least indicates a name of a called API function and a user associated with an account from which the API function call was initiated. The event record may also indicate an ID of a resource impacted by the API function call, a timestamp, and/or other event data/metadata.

At block 705, the detection system determines the name of the API function which was called and an ID of the impacted resource. The detection system can determine the name of the API function and resource ID from the event record (e.g., based on corresponding key-value pairs of the event record). In some examples, multiple related resource IDs may be included in the event record. To determine the resource ID of interest in these cases, the detection system can evaluate the event record based on heuristics to determine the resource ID of interest. The heuristics may be unique to the vendor or may be shared across vendors. For instance, the event record may indicate multiple resources involved in the API function call, where one of the resources is the primary instance that is impacted. As an example, the event record may indicate an array of resources comprising a virtual server and the associated network interface(s), virtual private cloud, security group(s), subnet, etc. The heuristics may indicate keywords used in names of resource types which correspond to primary instances of interest. The detection system can analyze values of resource type fields across the set of resources based on the heuristics to determine which of the resources has a type corresponding to a primary instance of interest.

At block 707, the detection system determines the class of operation into which the API function was previously classified. The detection system can maintain or have access to a data structure or file comprising the indications of functions of the API and their corresponding class corresponding to operation type, where the class is denoted with a bitmask. The system can determine the class of the API function having a corresponding bitmask from the data structure or file by utilizing the function name as a key or index into the data structure/file. For instance, the detection system can determine the class from a map which associates function names with bitmasks representative of class of operation type, where the determined function name is used as a key to retrieve the corresponding bitmask representing the class of operation type.

At block 708, the detection system determines if bit values corresponding to aggregated indications of operation types performed on the resource already exist for the resource ID. The detection system can determine if an entry in a structure which tracks operations performed on resources, such as a repository or data store of aggregated events per resource ID, has already been created for the resource ID, where events are aggregated by performing bitwise operations between bit values maintained in an entry for the resource ID and bit values corresponding to types of operations determined from API function call events that are part of the event stream. If such bit values do not exist, operations continue at block 709. If such bit values already exist, operations continue at block 710.

At block 709, the detection system initializes bit values in association with the resource ID to indicate the class of operation performed on the resource. The detection system can create a new entry in the structure (e.g., the repository or data store of aggregated events) for the resource ID, where the entry indicates the bitmask associated with the class of operation determined at block 707. Operations continue at transition point B, which continues at block 611 of FIG. 6.

At block 710, the detection system updates bit values associated with the resource ID to indicate the class of operation performed on the resource. The detection system can update an existing entry corresponding to the resource ID in the repository or data store of aggregated events to indicate the bitmask associated with the class of operation determined at block 707. The detection system can perform a bitwise operation between the existing bit values which are indicated in the entry for the resource ID and the bitmask associated with a class, such as a bitwise OR. Performing a bitwise OR between these bit values sets the bit corresponding to position of the bitmask associated with the class to 1, or "true," to indicate that an operation of the corresponding class has been performed on the resource in the time window. Operations continue at transition point B, which continues at block 611 of FIG. 6.

At block 611, the detection system determines if the resource was created and subsequently deleted within the time window. The detection system can determine that the resource was created and deleted within the time window if both the bit position corresponding to the class of create operations and the bit position corresponding to the class of delete operations (i.e., as given by their respective bitmasks) are set to 1, or "true," to indicate that both create and delete operations were performed on the resource during the time window. For instance, the detection system can perform a bitwise operation between the bit values indicating aggregated events for the resource, the bitmask corresponding to the class of create operations, and the bitmask corresponding to the class of delete operations, such as a bitwise AND. Performing a bitwise AND between these bit values facilitates a determination of whether the bit positions corresponding to the classes of create and delete operations are set to 1, or "true." Thus, if both bit positions of the result of the bitwise AND are set to 1, the resource can be determined to have been created and deleted within the time window. If the resource was created and deleted in the time window, operations continue at block 613. Otherwise, operations continue at block 615.

At block 613, the detection system indicates that the resource was potentially used to carry out an attack. Rapid creation and deletion of a resource indicates that the resource may have been used to perform a malicious action (e.g., execution of malicious code) and was quickly deleted/destroyed to evade detection. The detection system may generate an alert, notification, report, etc. which indicates the resource ID, user(s), and API functions identified in events associated with that resource. The generated indication may also comprise a suggestion of an action which can be taken to remediate the attack or prevent additional occurrences of a similar attack, such as a suggestion that the identified user(s) be blocked.

At block 615, the detection system determines if an additional event has been logged in the time window. The detection system can determine if there are additional events based on obtaining another event record of the event stream and/or based on the time window of event streaming still being active. If an additional event has been logged, operations continue at block 703 of FIG. 7. If no additional events have been logged or the time window of event streaming has ended, operations are complete.

Variations

To reduce false positive detections of potential attacks due to legitimate scaling of resources which occurs during the blind spot period, workload scaling behaviors can be baselined during an initial observation period. For instance, during the baselining period, resource creation and deletion events occurring as a result of scaling up or down can be monitored and the count of events can be recorded and leveraged as the baseline, or an expected/average count of resource creation and deletion activities expected as a result of workload scaling. Baselines may be established per resource type or may be averaged across resource types. Once the baselines have been established, during the attack detection stage, resource creation and deletion events occurring during the blind spot can be evaluated against the baseline. Creation and deletion events within the baseline count(s) may be allowed to go undetected as potential attacks. Once creation and deletion events exceed the baseline count(s), the events can then be flagged as potential attacks. As an example, with reference to FIG. 2, the detection system 203 may subscribe to the event stream 221 during an initial observation period to determine baselines. The baselines may be per resource type of the vendor 209, per function of the API 211, or across resource types and functions, for example. Once the observation period has ended and the baselines have been established, the attack detection stage may commence during the next blind spot period. The resource state analyzer 235 may maintain the baselines as an additional criterion against which the aggregated indications of events per resource are evaluated so that the resource state analyzer 235 can determine whether the aggregated indications of events indicate that detected creation and deletion events are expected and can be allowed to pass rather than flagged as potential attacks.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 603-615 can be performed at least partially in parallel or concurrently for events detected in rapid succession. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 8:
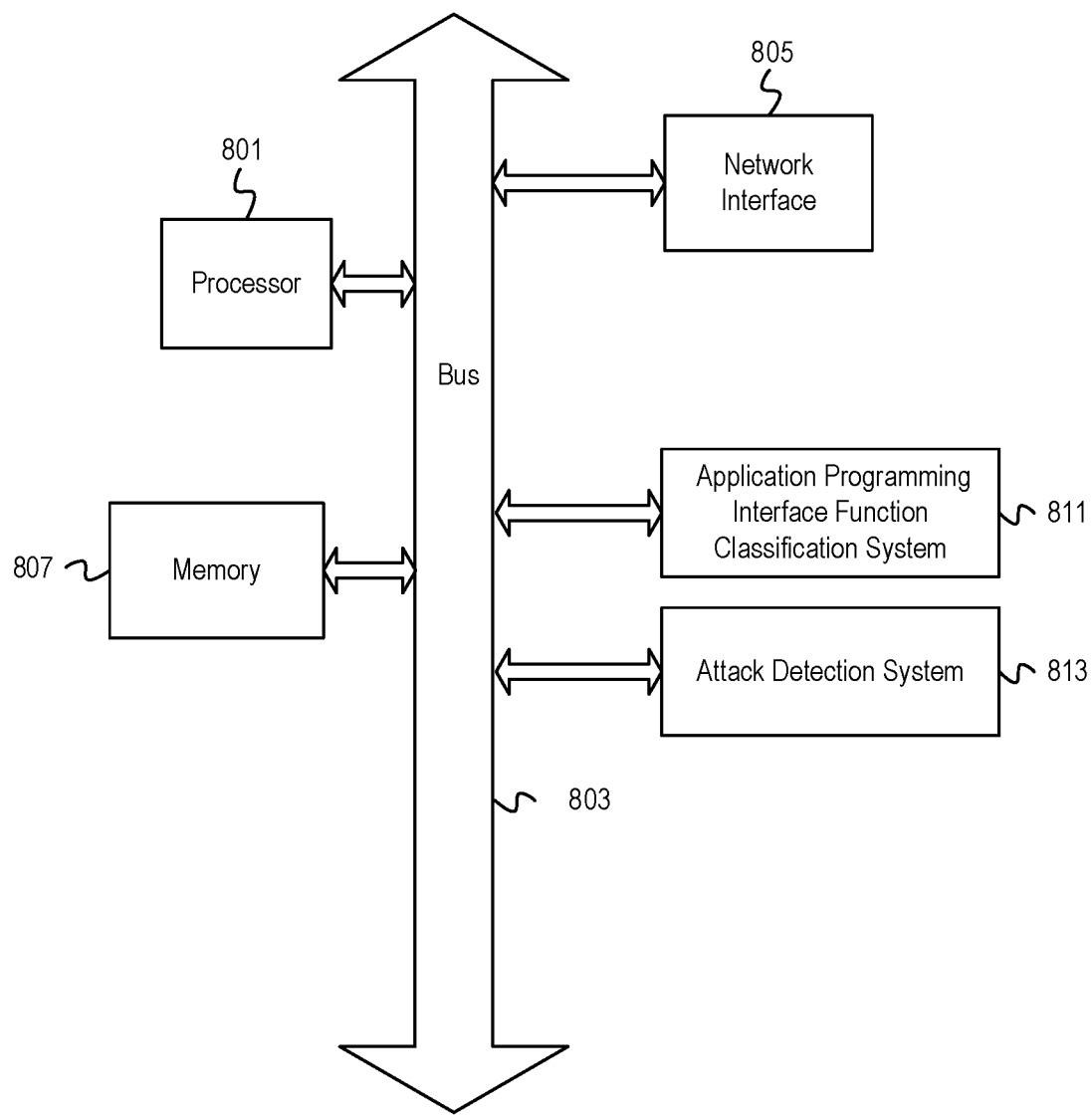
FIG. 8 depicts an example computer system with an API function classification system and an attack detection system.

FIG. 8 depicts an example computer system with an API function classification system and an attack detection system. The computer system includes a processor 801 (possibly including multiple processors, multiple cores, multiple nodes, and/or implementing multi-threading, etc.). The computer system includes memory 807. The memory 807 may be system memory or any one or more of the above already described possible realizations of machine-readable media. The computer system also includes a bus 803 and a network interface 805. The system also includes API function classification system 811 and attack detection system 813. The API function classification system 811 classifies functions of an API by a higher-level type, where the action type can be one of the CRUD operations, based on analyzing names of the API functions. The attack detection system 813 detects potential copy-paste/replacement attacks based on streaming events generated from invocations of the API functions during a "blind spot" period and tracking states of resources based on classes of API functions which have impacted the resources. Any one of the previously described functionalities may be partially (or entirely) implemented in hardware and/or on the processor 801. For example, the functionality may be implemented with an application specific integrated circuit, in logic implemented in the processor 801, in a co-processor on a peripheral device or card, etc. Further, realizations may include fewer or additional components not illustrated in FIG. 8 (e.g., video cards, audio cards, additional network interfaces, peripheral devices, etc.). The processor 801 and the network interface 805 are coupled to the bus 803. Although illustrated as being coupled to the bus 803, the memory 807 may be coupled to the processor 801.

While the aspects of the disclosure are described with reference to various implementations and exploitations, it will be understood that these aspects are illustrative and that the scope of the claims is not limited to them. In general, techniques for detection of copy-replace attacks through monitoring and classifying API function invocations as described herein may be implemented with facilities consistent with any hardware system or hardware systems. Many variations, modifications, additions, and improvements are possible.

Plural instances may be provided for components, operations or structures described herein as a single instance.

Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Terminology

This description uses shorthand terms related to cloud technology for efficiency and ease of explanation. When referring to "a cloud," this description is referring to the resources of a cloud service provider. For instance, a cloud can encompass the servers, virtual machines, and storage devices of a cloud service provider. The term "cloud destination" and "cloud source" refer to an entity that has a network address that can be used as an endpoint for a network connection. The entity may be a physical device (e.g., a server) or may be a virtual entity (e.g., virtual server or virtual storage device). In more general terms, a cloud service provider resource accessible to customers is a resource owned/managed by the cloud service provider entity that is accessible via network connections. Often, the access is in accordance with an application programming interface or software development kit provided by the cloud service provider.

This description uses the term "data stream" to refer to a unidirectional stream of data flowing over a data connection between two entities in a session. The entities in the session may be interfaces, services, etc. The elements of the data stream will vary in size and formatting depending upon the entities communicating with the session. Although the data stream elements will be segmented/divided according to the protocol supporting the session, the entities may be handling the data at an operating system perspective and the data stream elements may be data blocks from that operating system perspective. The data stream is a "stream" because a data set (e.g., a volume or directory) is serialized at the source for streaming to a destination. Serialization of the data stream elements allows for reconstruction of the data set. The data stream can be characterized as "flowing" over a data connection because the data stream elements are continuously transmitted from the source until completion or an interruption. The data connection over which the data stream flows is a logical construct that represents the endpoints that define the data connection. The endpoints can be represented with logical data structures that can be referred to as interfaces. A session is an abstraction of one or more connections. A session may be, for example, a data connection and a management connection. A management connection is a connection that carries management messages for changing state of services associated with the session.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. A method comprising:
based on streaming events during a time window, obtaining data of a first event of a stream of events, wherein the first event corresponds to a call to a first function of an application programming interface (API);
determining a classification of the first function, wherein the classification is one of a plurality of classifications corresponding to operation types,
wherein the operation types comprise create operations and delete operations,
wherein the plurality of classifications comprises a classification of create operations and a classification of delete operations;
based on identifying a resource indicated in the call to the first function, updating a first structure with an indication of a first of the operation types corresponding to the classification of the first function,
wherein the first structure tracks which of the operation types have been performed on the resource,
wherein updating the first structure comprises initializing an entry in the first structure for the resource with an indication of the first operation type based, at least in part, on determining that an entry in the first structure for the resource has not been initialized during the time window;
determining if the resource has been created and deleted during the time window based, at least in part, on the updated first structure; and
based on determining that the resource has been created and deleted during the time window, indicating that the resource was potentially involved in an attack carried out during the time window.

2. The method of claim 1 further comprising determining a bitmask associated with the classification of the first function, wherein each of the plurality of classifications is associated with a corresponding one of a plurality of bitmasks, and wherein the first structure comprises a sequence of bit values in association with an identifier of the resource.

3. The method of claim 2, wherein updating the first structure comprises performing a bitwise operation between the bitmask associated with the classification of the first function and the sequence of bit values, and wherein the updated first structure is a result of the bitwise operation.

4. The method of claim 3, wherein the bitwise operation comprises a bitwise OR operation between the bitmask and the sequence of bit values.

5. The method of claim 2,
wherein each bit position of the sequence of bit values indicates whether a corresponding one of the operation types has been performed on the resource, and
wherein determining if the resource has been created and deleted comprises performing a bitwise operation between the sequence of bit values, a first of the plurality of bitmasks corresponding to the classification of delete operations, and a second of the plurality of bitmasks corresponding to the classification of create operations.

6. The method of claim 5, wherein the bitwise operation comprises a bitwise AND operation.

7. The method of claim 1,
wherein the operation types further comprise update operations and other operations, and
wherein the plurality of classifications further comprises a classification of update operations and a classification of other operations.

8. The method of claim 1, wherein identifying the resource comprises identifying an identifier of the resource included in data of the first event.

9. The method of claim 1, further comprising determining a user associated with the call to the first function based, at least in part, on the data of the first event, wherein indicating that the resource was potentially involved in an attack comprises indicating information about the user.

10. An apparatus comprising:
a processor; and
a computer-readable medium having program code stored thereon that is executable by the processor to cause the apparatus to,
obtain data of a first event of a stream of events published during a time window, wherein the first event corresponds to a call to a first function of an application programming interface (API);
determine a classification of a plurality of classifications into which the first function was previously classified, wherein the plurality of classifications correspond to operation types,
wherein the operation types comprise create operations and delete operations and the plurality of classifications comprises a classification of create operations and a classification of delete operations;
based on identification of a resource indicated in data of the first event, update a first structure with an indication of a first of the operation types corresponding to the classification of the first function,
wherein the first structure tracks which of the operation types have been performed on the resource,
wherein the program code executable by the processor to cause the apparatus to update the first structure comprises program code executable by the processor to cause the apparatus to initialize an entry in the first structure for the resource with an indication of the first operation type based, at least in part, on a determination that an entry in the first structure for the resource has not been initialized during the time window;
determine if the resource has been created and deleted during the time window based, at least in part, on the updated first structure; and
based on a determination that the resource has been created and deleted during the time window, indicate that the resource was potentially involved in an attack carried out during the time window.

11. The apparatus of claim 10, further comprising program code executable by the processor to cause the apparatus to determine a bitmask associated with the classification, wherein each of the plurality of classifications is associated with a corresponding plurality of bitmasks, and wherein the first structure comprises a sequence of bit values in association with an identifier of the resource.

12. The apparatus of claim 11, wherein the program code executable by the processor to cause the apparatus to update the first structure comprises program code executable by the processor to cause the apparatus to perform a bitwise OR between the bitmask associated with the classification of the first function and the sequence of bit values, wherein the updated first structure is a result of the bitwise OR.

13. The apparatus of claim 11,
wherein each bit position of the sequence of bit values indicates whether a corresponding one of the operation types has been performed on the resource, and
wherein the program code executable by the processor to cause the apparatus to determine if the resource has been created and deleted comprises program code executable by the processor to cause the apparatus to perform a bitwise AND between the sequence of bit values, a first of the plurality of bitmasks corresponding to the classification of delete operations, and a second of the plurality of bitmasks corresponding to the classification of create operations.

14. The apparatus of claim 10 further comprising program code executable by the processor to cause the apparatus to determine a user associated with the call to the first function based, at least in part, on the data of the first event, wherein the program code executable by the processor to cause the apparatus to indicate that the resource was potentially involved in an attack comprises program code executable by the processor to cause the apparatus to indicate information about the user.

15. The apparatus of claim 10,
wherein the operation types further comprise update operations and other operations, and
wherein the plurality of classifications further comprises a classification of update operations and a classification of other operations.

16. One or more non-transitory machine-readable media having program code stored thereon, the program code executable by a processor to:
obtain data of a first event of a stream of events published during a time window, wherein the first event corresponds to a call to a first function of an application programming interface (API);
determine a classification of a plurality of classifications into which the first function was previously classified, wherein the plurality of classifications correspond to operation types,
wherein the operation types comprise create operations and delete operations and the plurality of classifications comprises a classification of create operations and a classification of delete operations;
based on identification of a resource indicated in data of the first event, update a first structure with an indication of a first of the operation types corresponding to the classification of the first function,
wherein the first structure tracks which of the operation types have been performed on the resource,
wherein the program code to update the first structure comprises program code to initialize an entry in the first structure for the resource with an indication of the first operation type based, at least in part, on a determination that an entry in the first structure for the resource has not been initialized during the time window;
determine whether the resource has been created and deleted during the time window based, at least in part, on the updated first structure; and
based on a determination that the resource has been created and deleted during the time window, indicate that the resource was potentially involved in an attack carried out during the time window.

17. The non-transitory machine-readable media of claim 16, further comprising program code to determine a bitmask associated with the classification, wherein each of the plurality of classifications is associated with a corresponding plurality of bitmasks, and wherein the first structure comprises a sequence of bit values in association with an identifier of the resource.

18. The non-transitory machine-readable media of claim 17, wherein the program code to update the first structure comprises program code to perform a bitwise OR between the bitmask associated with the classification of the first function and the sequence of bit values, wherein the updated first structure is a result of the bitwise OR.

19. The non-transitory machine-readable media of claim 17,
- wherein each bit position of the sequence of bit values indicates whether a corresponding one of the operation types has been performed on the resource, and
- wherein the program code to determine if the resource has been created and deleted comprises program code to perform a bitwise AND between the sequence of bit values, a first of the plurality of bitmasks corresponding to the classification of delete operations, and a second of the plurality of bitmasks corresponding to the classification of create operations.

20. The non-transitory machine-readable media of claim 16, further comprising program code to determine a user associated with the call to the first function based, at least in part, on the data of the first event, wherein the program code to indicate that the resource was potentially involved in an attack comprises program code to indicate information about the user.

* * * * *